R. SIMON.

METHOD OF PREPARING TRAMS FOR SILK GOODS.

No. 10,809. Reissued Feb. 22, 1887.

WITNESSES:

A. Schehl.

John M. Speer.

INVENTOR

Robert Simon.

BY

Brisen & Steele

ATTORNEYS

UNITED STATES PATENT OFFICE.

ROBERT SIMON, OF WEEHAWKEN, NEW JERSEY.

METHOD OF PREPARING TRAMS FOR SILK GOODS.

SPECIFICATION forming part of Reissued Letters Patent No. 10,809, dated February 22, 1887.

Original No. 308,526, dated November 25, 1884. Application for reissue filed February 13, 1886. Serial No. 191,882.

DIVISION A.

*To all whom it may concern:*

Be it known that I, ROBERT SIMON, of Weehawken, county of Hudson, and State of New Jersey, have invented certain new and useful Improvements in Methods of Preparing Trams for Silk Goods, of which the following is a specification.

Heretofore in weaving silk fabrics the tram or filling used was prepared by doubling two, three, and sometimes even more raw-silk threads, which together received a twist, in order to enable the winding of the tram thus formed onto bobbins after dyeing. After dyeing and winding, a number of the single tram-threads are again doubled together, according to the requirements of the goods to be produced. The finer the size of the single tram-threads which come to lie parallel, or nearly so, in each pick of the woven goods (to be made of a determined amount of tram) the more valuable the product, because the finest size of tram will produce the richest goods in touch and aspect—the two great qualities for which silk goods are so highly prized. The finer the tram-threads the greater is the difference in the cost of working them after dyeing and the greater the waste made in operations preliminary to weaving. As the increase in value of the product in which these fine sizes are used does not correspond with the increase of cost of production, the finer grades of silk goods could not be successfully produced in this country, owing to the high price of labor, but had to be imported.

The object of this invention is to provide an improved method by which even the best qualities of silk goods, having both the softest and most pliable touch and the most natural luster attainable, can be manufactured at a greatly-reduced cost of production, and will have, when manufactured, a highly-improved appearance; and the invention consists in the method of preparing trams for silk goods by doubling the entire number of raw-silk threads required for the size of tram to be used for each pick, twisting them, and untwisting them after dyeing, whereby a tram of nearly parallel raw-silk threads is obtained.

Figure 1:
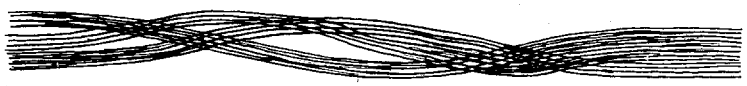
Figure 2:
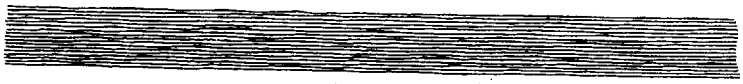
Figure 3:
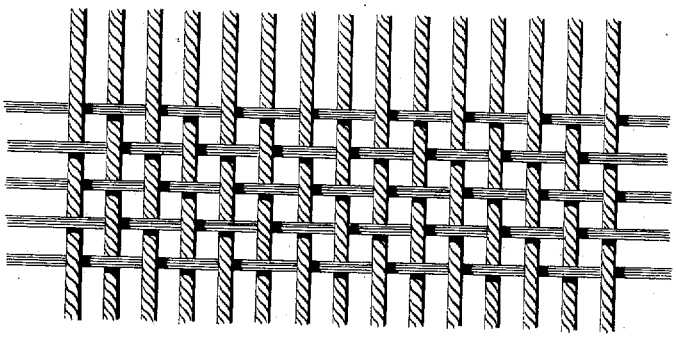

In the accompanying drawings, Figure 1 represents a side view of a tram as used heretofore; Fig. 2, a diagram of a tram made according to my invention; and Fig. 3 is a diagram of a piece of silk fabric woven with my improved tram, all the figures being magnified or drawn on an enlarged scale.

In carrying out my invention a number of raw-silk threads are first doubled on a bobbin to the required size of tram for the goods. They are then put on a throwing-mill, where the ordinary twist for tram is given. The so-called tram is dyed, and after dyeing placed again on a throwing-mill, in which the throwing-spindles turn in a reverse direction to the first twist, but which gives the same number of turns to the yard, or nearly so, as the first throwing-mill, so as to untwist the threads of the tram and produce a tram of raw-silk threads lying parallel, or nearly so, to each other, as shown in Fig. 2. The tram is then wound on quills, which are placed in the loom-shuttles and used for the weft of the fabric, which receives thereby a highly-improved, softer, and fuller appearance than usual, while considerable waste and expense are avoided.

Having thus described my invention, I claim as new and desire to secure by Letters Patent—

The method herein described of preparing trams for silk goods, which consists in doubling a number of raw-silk threads, twisting the doubled threads, dyeing the same, and untwisting said threads after dyeing, substantially as set forth.

In testimony that I claim the foregoing as my invention I have signed my name in presence of two subscribing witnesses.

ROB. SIMON.

Witnesses:
CHAS. P. SCHNUERIGER,
JOHN CATON.